(12) United States Patent
Weiler

(10) Patent No.: US 9,042,808 B2
(45) Date of Patent: May 26, 2015

(54) DIDACTIC APPLIANCE

(75) Inventor: Michael Weiler, Berkeley, CA (US)

(73) Assignee: Edupath, INC., Berkeley, CA (US)

( * ) Notice: Subject to any disclaimer, the term of this patent is extended or adjusted under 35 U.S.C. 154(b) by 1043 days.

(21) Appl. No.: 12/838,244

(22) Filed: Jul. 16, 2010

(65) Prior Publication Data

US 2011/0136094 A1     Jun. 9, 2011

Related U.S. Application Data

(60) Provisional application No. 61/226,594, filed on Jul. 17, 2009.

(51) Int. Cl.
    G09B 7/00     (2006.01)
    G09G 5/00     (2006.01)
    G09B 7/02     (2006.01)

(52) U.S. Cl.
    CPC ... *G09B 7/00* (2013.01); *G09B 7/02* (2013.01)

(58) Field of Classification Search
    CPC .................................. G09B 7/00; G09B 7/02
    USPC .......................................... 434/362; 345/659
    See application file for complete search history.

(56) References Cited

U.S. PATENT DOCUMENTS

| | | | |
|---|---|---|---|
| 6,470,170 B1 * | 10/2002 | Chen et al. | 434/350 |
| 6,704,007 B1 * | 3/2004 | Clapper | 345/204 |
| 7,062,220 B2 * | 6/2006 | Haynes et al. | 434/353 |
| 7,918,666 B1 * | 4/2011 | Lewolt | 434/322 |
| 2001/0036619 A1 * | 11/2001 | Kerwin | 434/118 |
| 2004/0214146 A1 * | 10/2004 | Harris et al. | 434/191 |
| 2005/0069849 A1 * | 3/2005 | McKinney et al. | 434/178 |
| 2006/0166172 A1 * | 7/2006 | May | 434/185 |
| 2007/0016575 A1 * | 1/2007 | Hurst-Hiller et al. | 707/5 |
| 2007/0031803 A1 * | 2/2007 | Hirst | 434/323 |
| 2007/0178432 A1 * | 8/2007 | Davis et al. | 434/353 |
| 2007/0255805 A1 * | 11/2007 | Beams et al. | 709/218 |
| 2007/0259685 A1 * | 11/2007 | Engblom et al. | 455/550.1 |
| 2008/0115069 A1 * | 5/2008 | Veselova | 715/760 |
| 2008/0195969 A1 * | 8/2008 | Brown et al. | 715/802 |
| 2009/0186328 A1 * | 7/2009 | Robinson et al. | 434/350 |
| 2010/0003659 A1 * | 1/2010 | Edmonds | 434/350 |
| 2010/0159437 A1 * | 6/2010 | German et al. | 434/433 |
| 2010/0248202 A1 * | 9/2010 | Thompson et al. | 434/276 |

OTHER PUBLICATIONS http://web.archive.org/web/20130623032902/http://numbermate.com/ Wayback Machine Date of Jun. 23, 2013.*

* cited by examiner

*Primary Examiner* — Xuan Thai
*Assistant Examiner* — Michael Grant
(74) *Attorney, Agent, or Firm* — Van Pelt, Yi & James LLP

(57) ABSTRACT

Deficiencies in existing attempts at educational software solutions are addressed by providing systems, methods, and devices that both replicate and facilitate the necessary elements of successful classroom-based learning, while taking advantage of the platform-specific benefits of handheld computing devices. Various applications address the issue of the limited screen size of mobile devices by using the motion sensors of the devices both to move from one part of a program to another, thus eliminating the need for on-screen navigation buttons and allowing the entire screen to be used for content, and also to reinforce learning through the use of mnemonics. In these applications, the user rotates the device after completing each step, in sequence, of a process-based series of problem solving techniques. Group learning dynamics are also reproduced through a study group feature.

23 Claims, 16 Drawing Sheets

AT&T 1:14 PM

Criminal Minds

⟨Pause⟩

5. The author compares Napoleon and Frederick to Sheppard and Peace (lines 19-24) in order to:

⟨Back⟩

Mr. Basil Thomson, the present head of the Criminal
Investigation Department, has said recently that a great
deal of crime is due to a spirit of "perverse adventure" on
60 the part of the criminal. The same might be said with
equal justice of the exploits of Alexander the Great and
half the monarchs and conquerors of the world, whom we are
taught in our childhood's days to look up to as shining
examples of all that a great man should be. Because crimes
65 are played on a great stage instead of a small, that is no
reason why our moral judgment should be suspended or
silenced. Class Machiavelli and Frederick the Great as a
couple of rascals fit to rank with Jonathan Wild, and we are
getting nearer a perception of what constitutes the real
70 criminal. "If," said Frederick the Great to his minister,
Radziwill, "there is anything to be gained by it, we will be
honest; if deception is necessary, let us be cheats."
These are the very sentiments of Jonathan Wild.

Swipe the passage with two fingers to proceed

A study has shown that there are still millions of people who are unaware that they endanger their health by smoking cigarettes. This is so despite government campaigns to warn people of the dangers of smoking. Reluctantly, one has to draw the conclusion that the mandatory warnings that tobacco companies are required to print have had no effect.

Question hint

Before looking at the answer choices, consider what would refute the argument. Are there people who are aware of the dangers of smoking because of the warnings? Now you know what you are looking for!

OK

Exit

2. Which one of the following, if true, would refute the argument in the passage?

A. Many people who continue to smoke are aware of the dangers of smoking.

B. Some people smoke cigarettes for legitimate reasons.

C. Government has had to force companies to warn potential customers of the dangers of their products.

D. Some people who are aware of the dangers of smoking were made aware of them by the mandatory warnings.

E. Smoking is clearly responsible for a substantial proportion of preventable illness in the country.

DIDACTIC APPLIANCE

CROSS REFERENCE TO RELATED APPLICATIONS

This patent application claims the benefit of U.S. provisional patent application Ser. No. 61/266,594 filed Jul. 17, 2009, the entirety of which is incorporated herein by this reference thereto.

BACKGROUND OF THE INVENTION

1. Technical Field

The invention relates to educational techniques. More particularly, the invention relates to a didactic appliance.

2. Description of the Background Art

The proliferation of computers, cell phones and electronic book readers has led to widespread attempts to use portable electronic devices for education. However, existing efforts to have met with limited adoption among consumers and educators due to a range of issues.

The modern classroom consists of a number of elements, each of which is necessary for educating students, yet most software only reproduces a single element of a learning environment. Furthermore, classroom-based learning tends to be process-based, while software tends to be results-oriented. For example, a teacher introduces math students to concepts in a classroom. The teacher carefully selects material to highlight a specific series and sequence of steps necessary for solving the material. It is widely understood in educational circles that students benefit significantly from both explaining their perspectives to other students, and receiving instruction from other students. The teacher therefore usually prompts students with open-ended questions to facilitate peer learning. Existing software solutions remove the teacher from the learning process, and do not generally incorporate the elements of peer learning into the presentation of the materials. Rather, currently available educational software offers students opportunities for online testing or practice to reinforce learning that has happened elsewhere.

By attempting to extract single elements of a classroom experience from their natural context, educational software generally also fails to leverage integrated curricula successfully, thus eliminating an opportunity to reinforce student learning strongly. Standardized test preparation represents a large component of existing educational software, however substantial score improvements are generally demonstrated only when presented in an environment that provides opportunities for process-based learning and peer review.

There are however potential advantages to the computer-enabled device in comparison to the traditional classroom setting. A significant component of the learning process is the ability of the educator to maintain the students' interest. In addition, because a large percentage of students use computing systems and technology for social interactions, a great potential exists for building educational elements directly into students' leisure time activities.

Of particular concern in adapting mobile devices for use with education and research is the small screen size.

SUMMARY OF THE INVENTION

A presently preferred embodiment of the invention, addresses deficiencies in existing attempts at educational software solutions by providing systems, methods and devices that both replicate and facilitate the necessary elements of successful classroom-based learning, while taking advantage of the platform-specific benefits of handheld computing devices.

BRIEF DESCRIPTION OF THE DRAWINGS

FIGS. 1a-1c illustrate a problem solving sequence as it appears on a display of a hand held device according to the invention;

FIG. 4 illustrates a display of a split screen with questions revealed after the device has been shaken to display a first-level hint for the student according to the invention;

FIG. 5 illustrates a test review mode in which the questions are color coded (shown on FIG. 5 via shading) based on whether the student answered them correctly, incorrectly, or skipped them according to the invention;

FIG. 6 illustrates a split screen in a larger format with diagramming of rules according to the invention;

FIG. 7 illustrates a split screen after the user swiped the screen with two fingers to reveal the answer choices and begin the process of elimination according to the invention;

DETAILED DESCRIPTION OF THE INVENTION

A presently preferred embodiment of the invention, addresses deficiencies in existing attempts at educational software solutions by providing systems, methods and devices that both replicate and facilitate the necessary elements of successful classroom-based learning, while taking advantage of the platform-specific benefits of handheld computing devices, such as Apple's iPhone.

In some embodiments, the applications address the issue of the limited screen size of mobile devices by using the motion sensors of the devices both to move from one part of a program to another, thus eliminating the need for on-screen navigation buttons and allowing the entire screen to be used for content, and also to reinforce learning through the use of mnemonics. A preferred embodiment uses such rotation to reinforce each of a series of steps. Unlike in a typical learning scenario, in a presently preferred embodiment of the invention, the user does not have access to all of the information necessary to solve a problem or answer a question. Instead, when the user has processed the information that is available, the user rotates the device or performs a gesture, such as a two-fingered swipe (device dependent) to dismiss the current information set and release the next block of information. By forcing the user through this process, the user is trained in a specific approach and sequence to solving problems.

An example of a mnemonic that can be used to reinforce learning is as follows:

PLAPOE

{Pl(a)-poe}

1. (P): (view the) prompt in portrait
2. (l): look at the line references in landscape
3. ((a)): anticipate
4. (poe): process of elimination in portrait.

Figure 1C:

In these applications, the user rotates the device after completing each step, in sequence, of a process-based series of problem solving techniques. The rotation of the device only works as a navigation tool if the student has completed the step, and the first letter of the direction the device is facing after each rotation is consistent with the next element of the mnemonic, i.e. portrait view to view the prompt. FIGS. 1a-1c illustrate a problem solving sequence as it appears on the display of a hand held device, where the task step appears in a landscape orientation and the prompt appears in a portrait orientation, according to the invention. Thus, FIG. 1a shows a question in portrait view, the device is then rotated to landscape to display the passage (FIG. 1b), and the device is then rotated back to portrait to display the answer choices with some process of elimination having already taken place (FIG. 1c). Thus, the depicted sequence shows going from a question, then a passage, then a question with answers. Those skilled in the art will appreciate that the orientation of the task and prompt can be reversed in some embodiments of the invention. In the example of FIG. 1, the user is permitted to proceed to the next sequence of instruction only if the prompt is correctly completed.

Whereas most educational software offers the user an opportunity to practice concepts, these applications are training systems that break down the learning process (or specific implementation) into tangible steps, each of which must be demonstrated before the user can more onto the next step or screen of the application. Pedagogically, the difference between practice and training is key, because practice reinforces existing habits, and training guides users through establishing and naturalizing new habits. Similar to having a personal trainer, the applications herein disclosed track user choices, selections, and performance to adapt content to an appropriate level, and inform instruction. Content has been written specifically for this purpose.

In further embodiments, the applications take advantage of touch screens to train the user to use the steps necessary to successfully complete and/or master tasks in such a way that the process can be replicated in real-world use.

Figure 2:
FIG. 2 illustrates a process of elimination as it appears on a display of a hand held device according to the invention.

If, in preparation for a multiple-choice standardized test, the desired outcome in real-world use is that the user needs to cross off potential answer choices as part of a process of elimination, then the device simulates this behavior by requiring the user to cross off answer choices on the screen using either a finger or a stylus, as shown in FIG. 2.

Or, if the desired first step in solving a problem is to identify and circle the variable for which that the student is solving, then the application requires that the student circle the correct variable with either a finger or a stylus before permitting that other steps or actions be taken. Or, if a step in the desired training process is to eliminate portions of a prompt that are not deemed necessary for solving the problem, then the user can do so using a finger or stylus.

If the desired training practice requires that the user eliminate answers in a particular order, then only the answers correlating to each step of the training practice are displayed to the user to ensure that the user's practice remains consistent with the desired training practice.

The use of the embodiment of the invention is intended to simulate the actual paper and pencil experience students have, so that learning and training are completely transferable to an actual test scenario.

Figure 3:
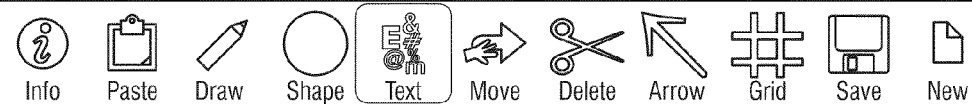
FIG. 3 illustrates a display of user-generated content side-by-side in a split screen mode according to the invention.

In still other embodiments, if the recommended approach to problem solving requires that the user synthesize information into notes that can be viewed next to subsequent questions, such as in logic-based questions of the LSAT, then the device offers a notepad for user notes with a toolbar to simplify the functions necessary for the specific content. Or, in math questions, the notepad adapts to incorporate calculator functions into the toolbar, and incorporate an editable calculator tape into the user-generated content. The user-generated content can then be displayed transparently over a question, or side-by-side in a split screen mode, as shown in FIG. 3.

In other embodiments, the user touches an area of a sentence or reading passage to type notes into that area of the text. If the user at any point encounters unfamiliar vocabulary words, then the user can tap on the word in question to add that word to a personal vocabulary list. The various embodiments of the invention then offer the user dictionary information for those words, as well as an opportunity to study the words through electronic flash cards and vocabulary quizzes, and the ability build a history of learned words.

In yet other embodiments, the applications aid in the organizing, delineating, indexing, classifying, and note taking of texts necessary for various academic pursuits. User-defined colors, gestures, and voice commands enable users to create searchable and sortable indexing and classification systems. Excerpts or words can have multiple tag associations, including hierarchical tags, which are then displayed or hidden depending upon the preferences selected for the parent tag. If the device is equipped with video or photo capabilities, then the user is also able to incorporate images into the searchable indexes, and tag such images as if they were text.

The applications herein disclose also fetch or import public domain text sources from the Internet and convert the text to data that can be used in the applications. A writer may, for instance, tag and sort information by character or scene, and import historical information from online resources, which is then attributed to the correct tag. Or, a doctoral student can import source texts for a thesis, index the portions that are used with full bibliographic information, and discard the rest. Thus, one embodiment of the invention offers users a mechanism for efficiently searching and manipulating information from Web sources. Here, the system understands what the user is looking for based on the content that the user has already viewed, and the specific launch point for the search query. In many cases therefore, the user should not have to enter any additional information to find relevant Web results, which then can be seamlessly incorporated back into the users own documents, files, etc.

The applications herein disclosed export the tagged data, including bibliographic information and user-generated notations or edits, to a variety of third party applications and formats, or save the data to the user's online storage system. The applications also enables the user to share tagged, indexed files with other users through a variety of third party services, or directly from device to device.

In another embodiment, the applications herein disclosed allow the user to employ a properly equipped mobile device for controlling content in the user's computer in the manner described herein via a Bluetooth connection.

In yet other embodiments, the user can shake the device when uncertain, and a teacher's advice related to the specific question appears in pop-up screen, guiding the student to reinforce the method of solving problems (see FIG. 4).

Figure 5:
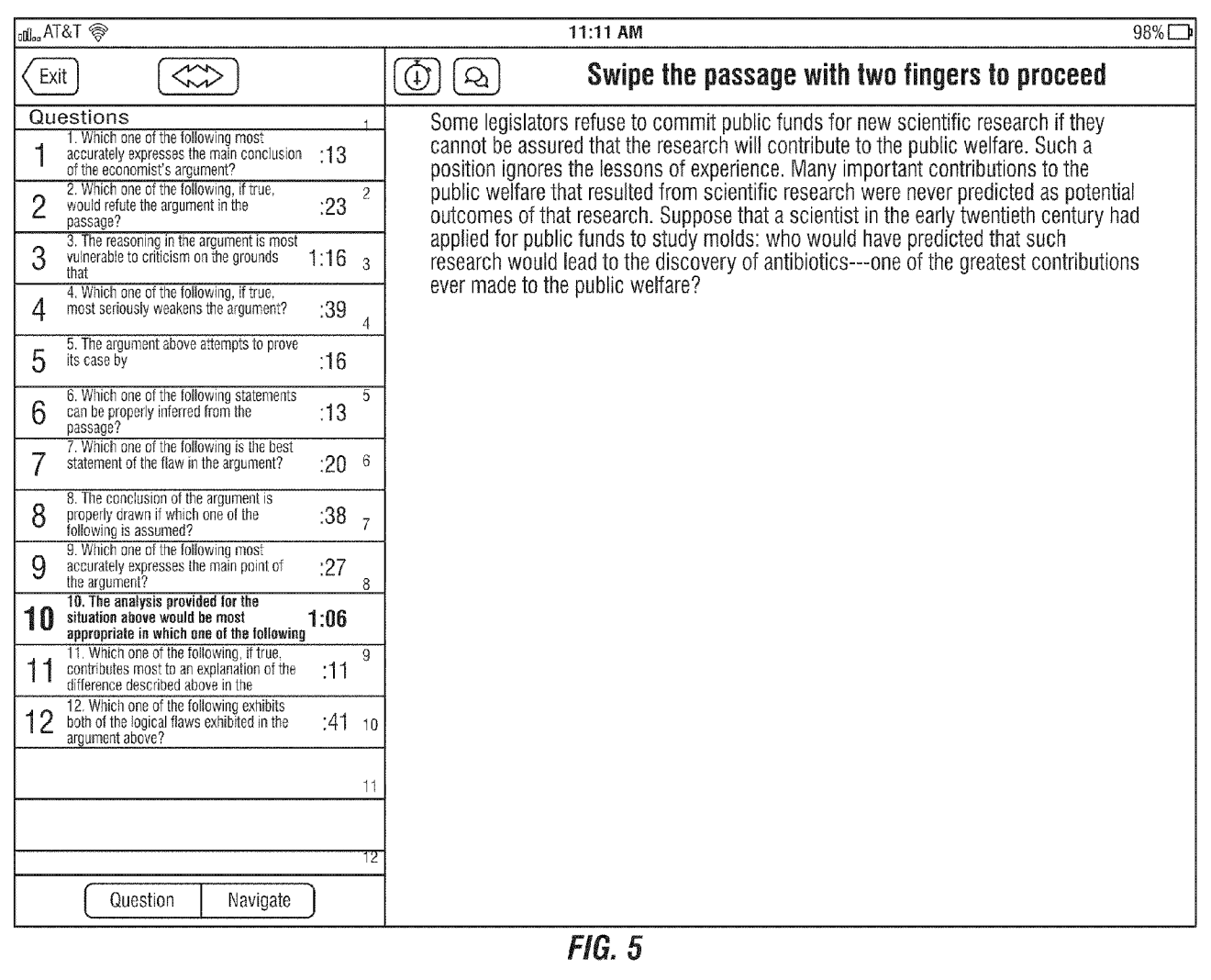

In yet other embodiments (see FIG. 5), a test review mode is provided in which the questions are color coded (shown on FIG. 5 via shading) based on whether the student answered them correctly, incorrectly, or skipped them. The, time to answer per question is added. The student can take any test as many times as he wants and compare progress because all test data is logged. The student is also able to filter what is displayed here to see only questions of a certain type, and view chronological progress per type, etc.

Figure 6:
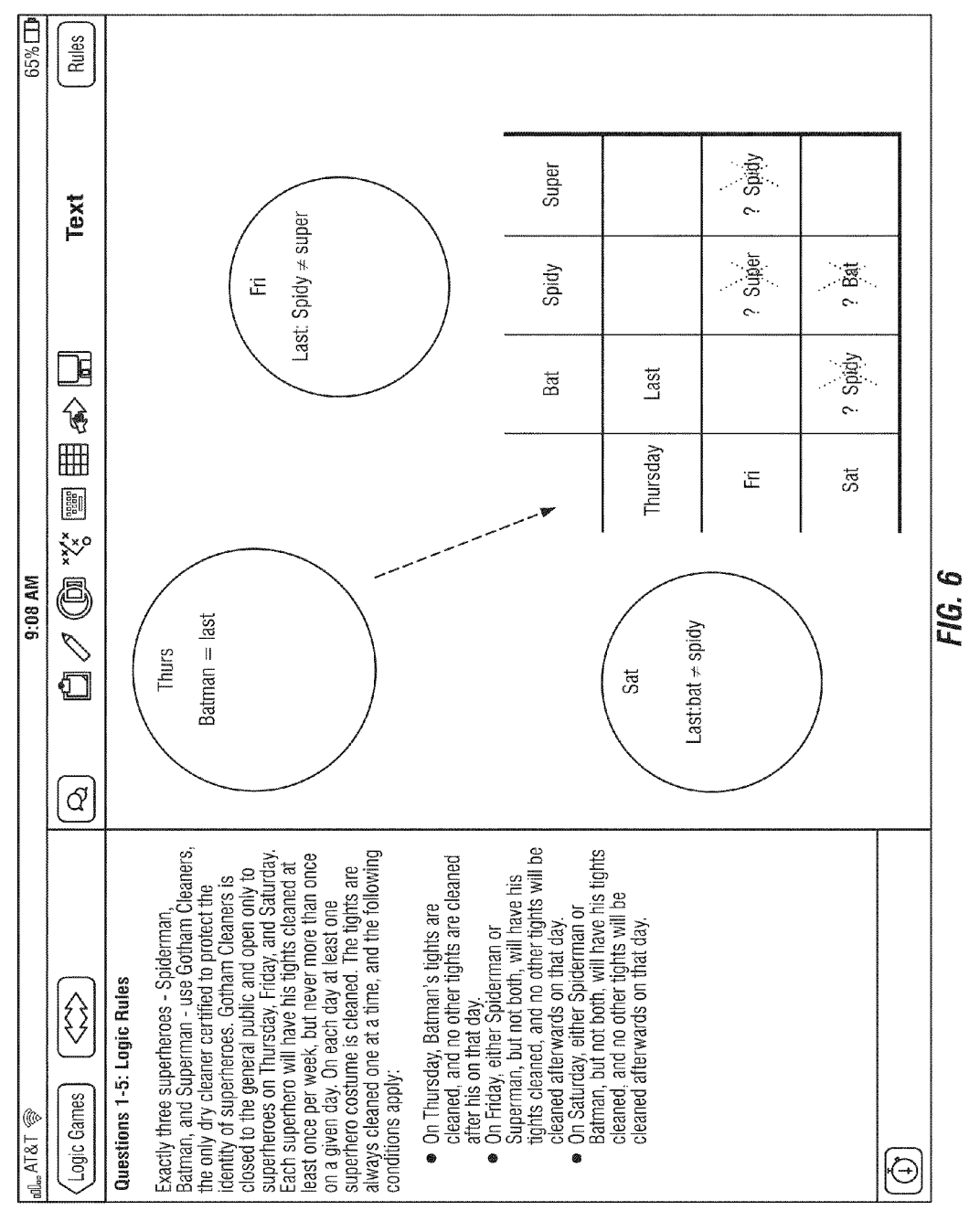

In yet other embodiments, a split screen is provided in a larger format with diagramming of rules (see FIG. 6).

Figure 7:
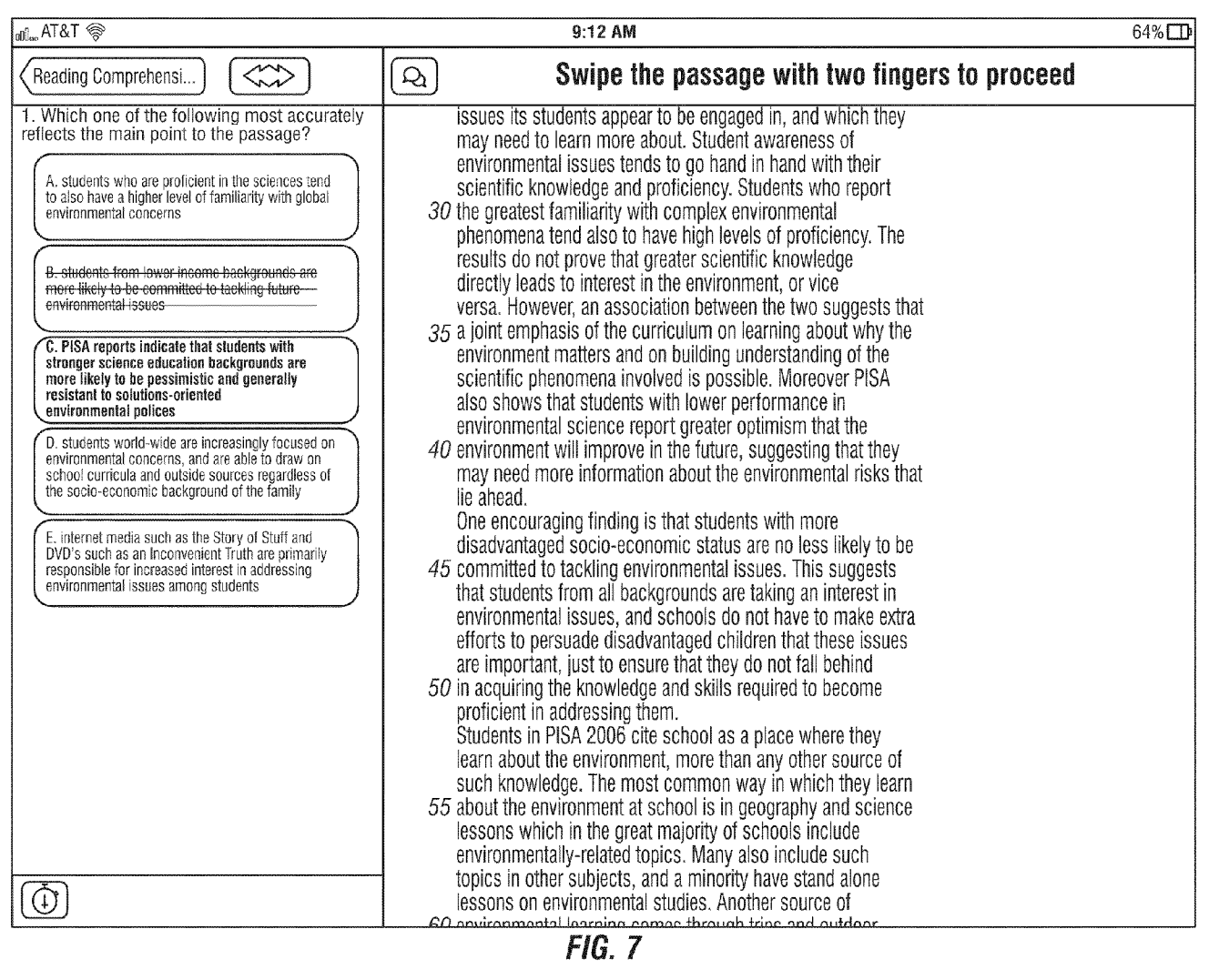

In yet other embodiments, a split screen is provided after the user swiped the screen with two fingers to reveal the answer choices and begin the process of elimination (see FIG. 7).

Figure 8:
FIG. 8 illustrates a split screen prior to revealing the answer choices according to the invention.

In yet other embodiments, a split screen is provided prior to revealing the answer choices (see FIG. 8).

In some instances, rotating the device also moves between a video, textbook, or audio content on the same theme, so that different types of learners can access content through a format that is optimal for the individual learning style. In some of the videos, every aspect of the screen is tagged, so that touching any portion of the video may pause the video and deliver either pre-loaded content or search results that are relevant to what the user touched. For instance, if a high school student is watching a presentation on the Civil War, and touches a weapon held by a solider in the video, the application queries the Web for information related to weapons used during that period. The application can be set to pause the video and display the information or save all searches and related content to be viewed later.

An embodiment also tracks each student's movements, both within the application content and the related Web queries. The teacher or administrator can remotely access this information and then use it to adapt curriculum to speak more directly to student interests, or to help to evaluate test results and class performance, learning styles, preparation for teacher conferences, or for making recommendations for further educational enrichment for the student. This aspect of the invention also applies to the Study Group features discussed below and to assessing where the student's strengths are, how actively the student responds to other students' inquiries, etc. In some instances, the Study Group may also be extended to connect a student's device directly to a teacher's device or that of another student, who has been identified by the system, or who self-identified as having sufficient expertise in a specific subject matter to be able to assist the student through any combination of text, chat, voice, video, file sharing, or screen sharing.

Figure 9:
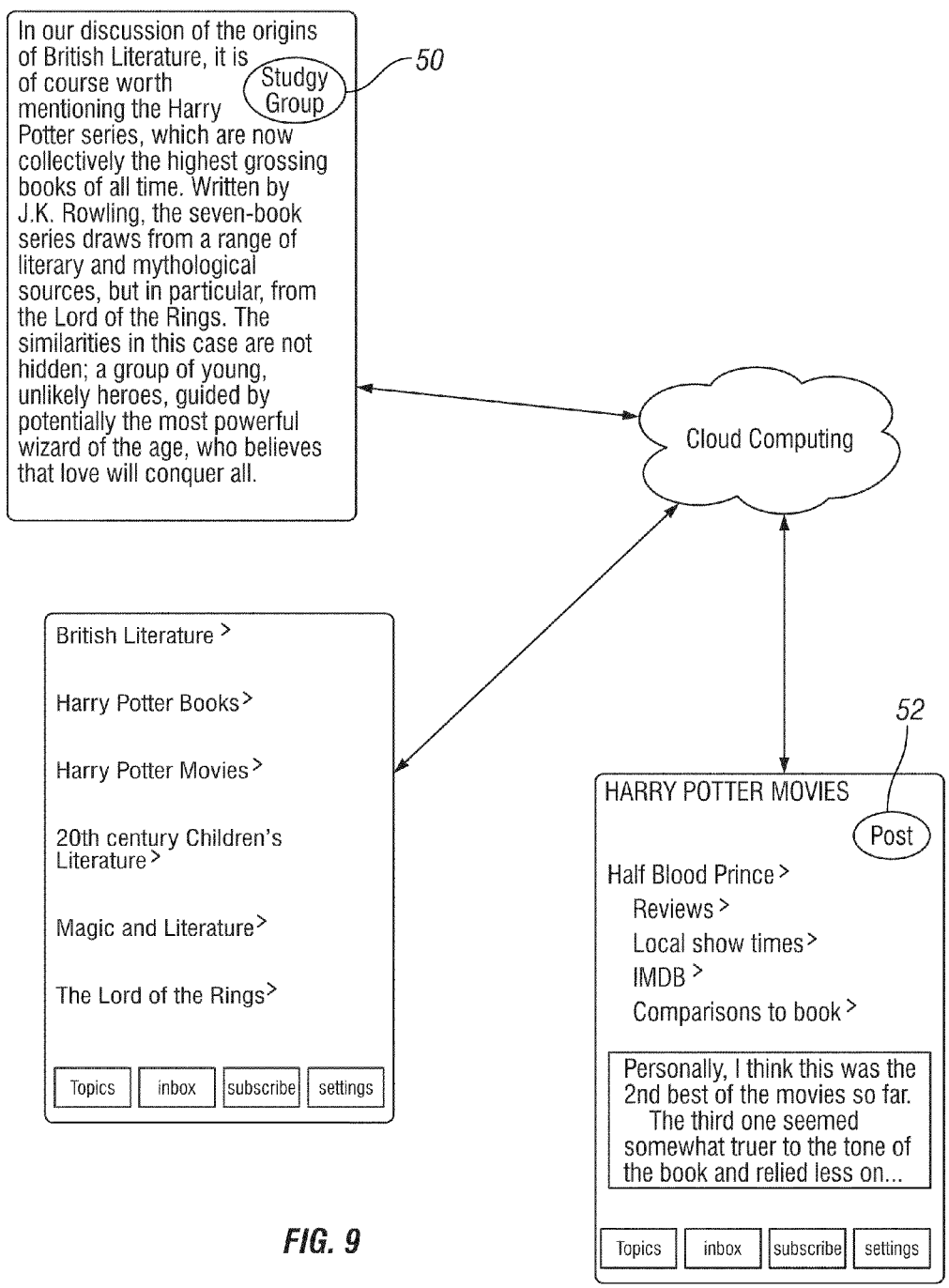
FIG. 9 illustrates a display of a peer assistance feature according to the invention.

As shown in FIG. 9, peer assistance is available for any question or text from within any of the aforementioned applications. The user need only select one of the StudyGroup buttons 50 from any question, text, or application to query the database for all prior conversations related to that question, topic or the content of that application. Information that is ported into the application from the Web or other sources is automatically searchable, and is tagged and added to the database, so that it may be queried or commented on by users (see FIG. 5, discussed in greater detail below). Users can adjust preferences to determine how broadly the application searches. For instance, if a student is currently working on an LSAT reading question dealing with property rights, the user could adjust the settings to return only those results related to the specific question, the general type of question, a discussion of the content of the question (property rights), or related content from the Internet.

Likewise, if a student imports Dostoyevsky's *Crime and Punishment*, query settings could be limited to the book or the author, the period/style of literature, or related content from the Internet. In addition, the user can also seed discussions which would then become searchable for other users, such as in this case perhaps, teaching Crime and Punishment to high school students. If the user has further questions than are found in the database, or can provide further information than is currently available in the database, the user can post a question or comment, including hyperlinks, using a Post button 52 and receive notifications back to the device, if the question is answered, receive additional information to the question, or text that is supplied by other users.

Figure 10:
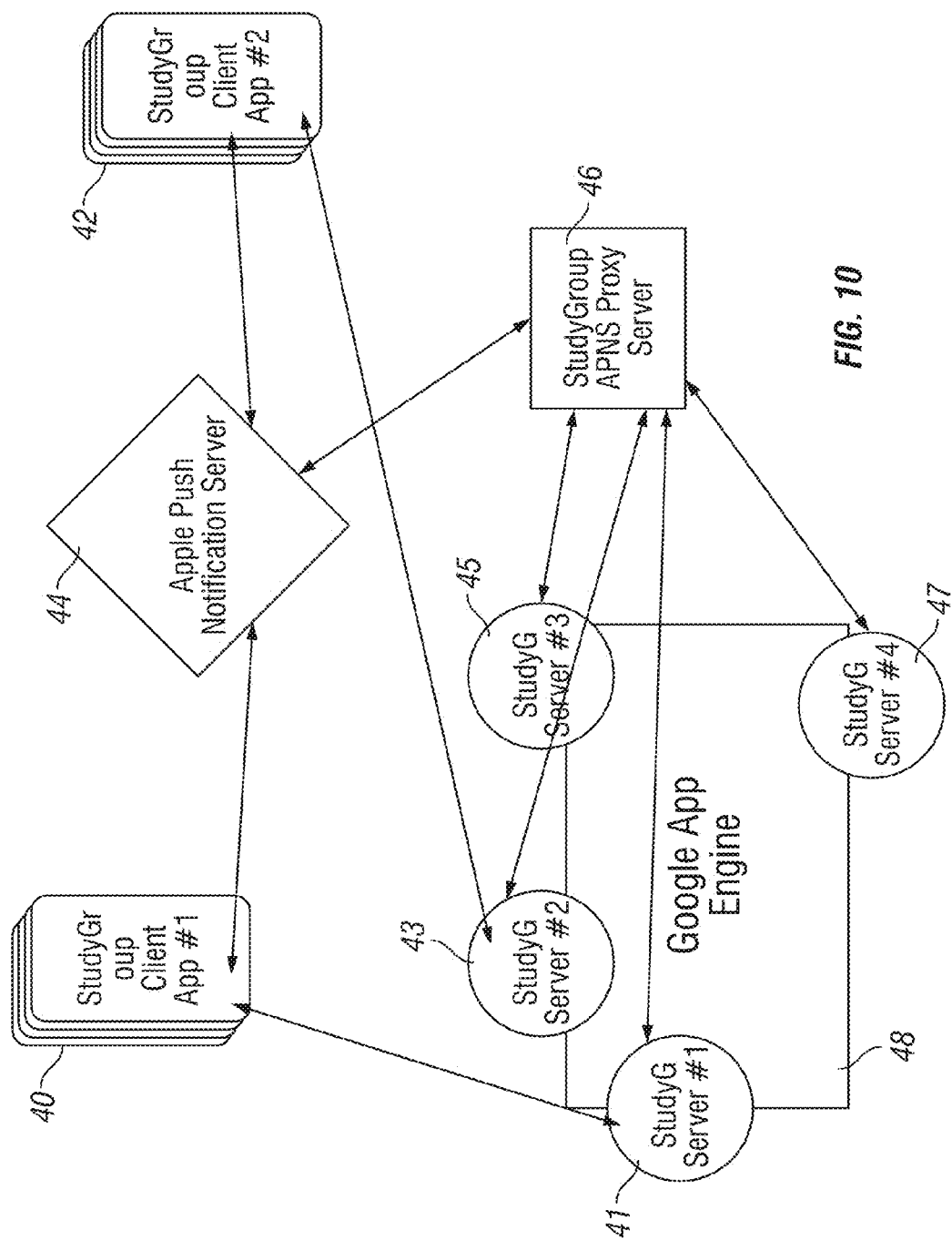
FIG. 10 is an architectural diagram showing a peer assistance feature according to the invention.
Figure 11A:
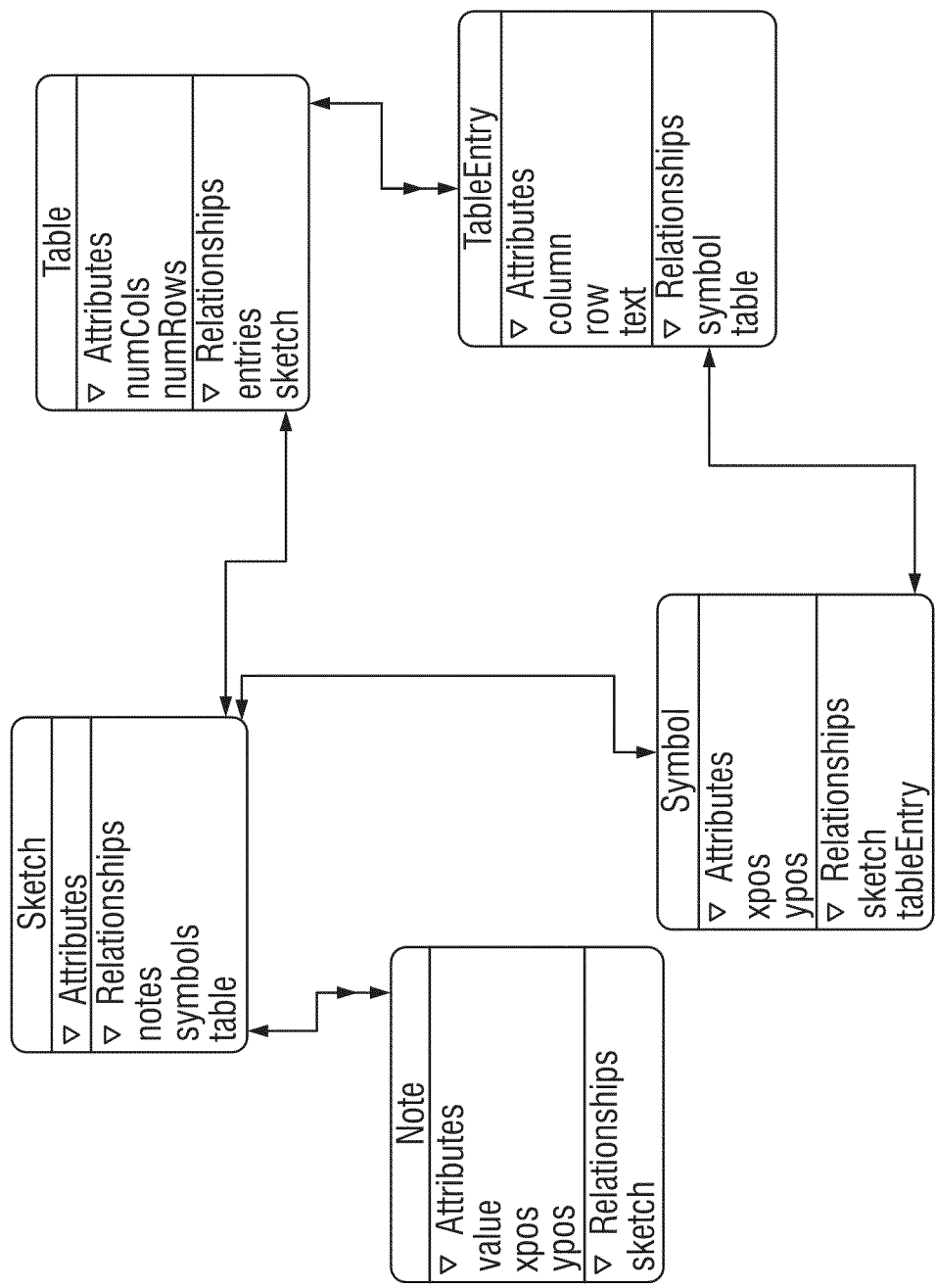
FIGS. 11a-11e illustrate exemplary database schema for use in connection with according to the invention.
Figure 11B:
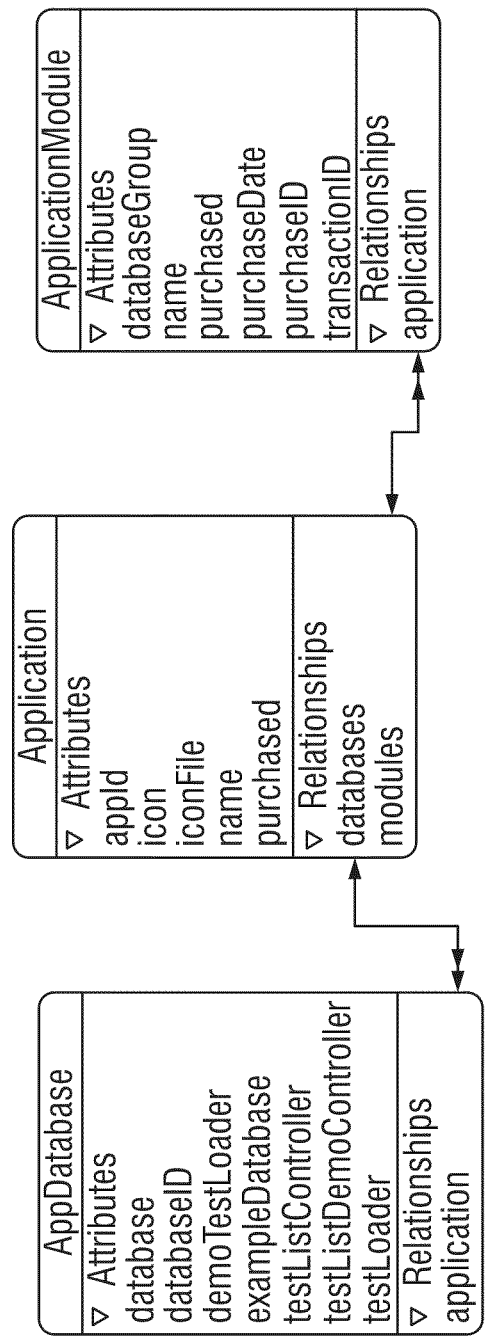
Figure 11C:
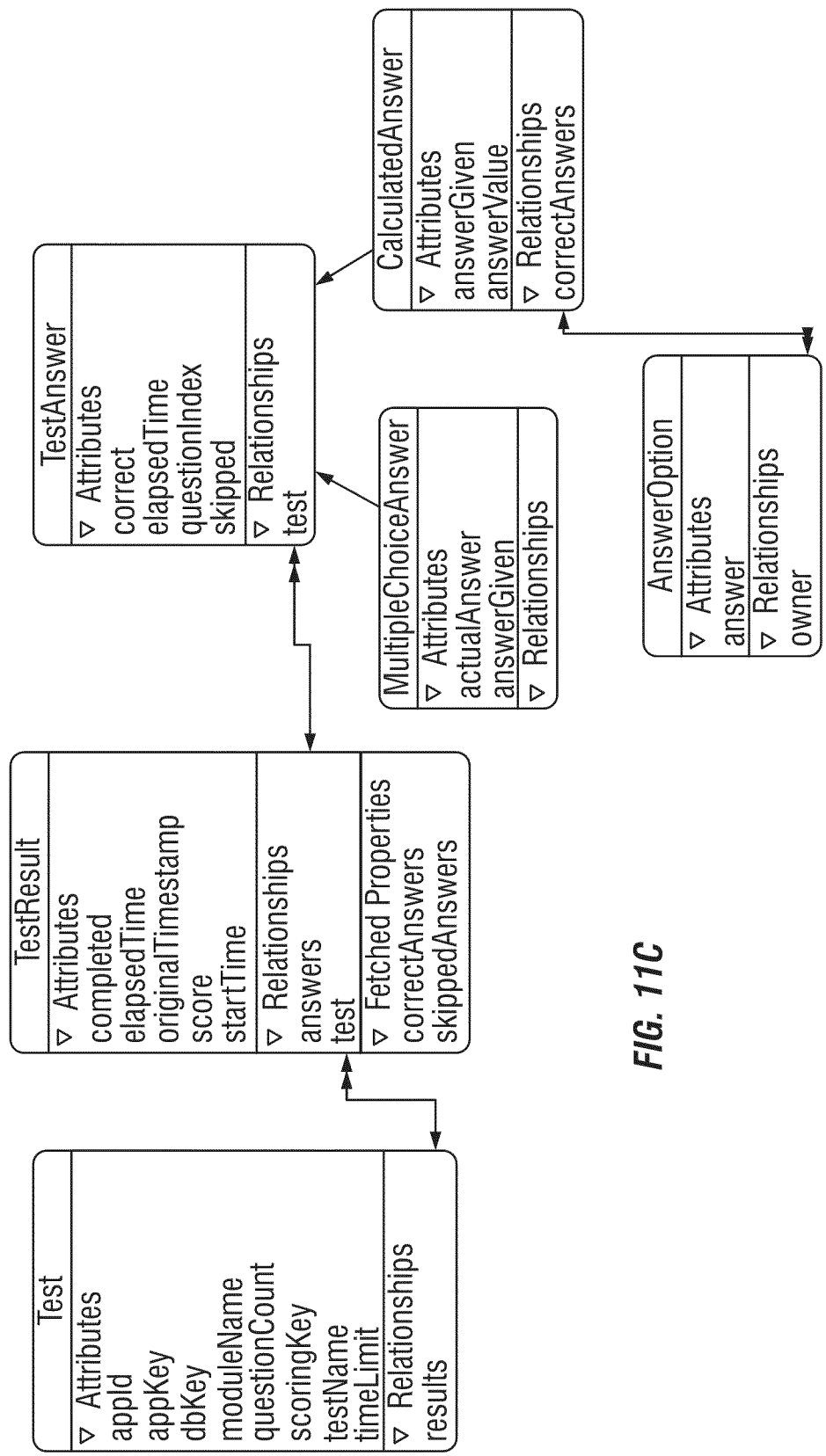
Figure 11D:
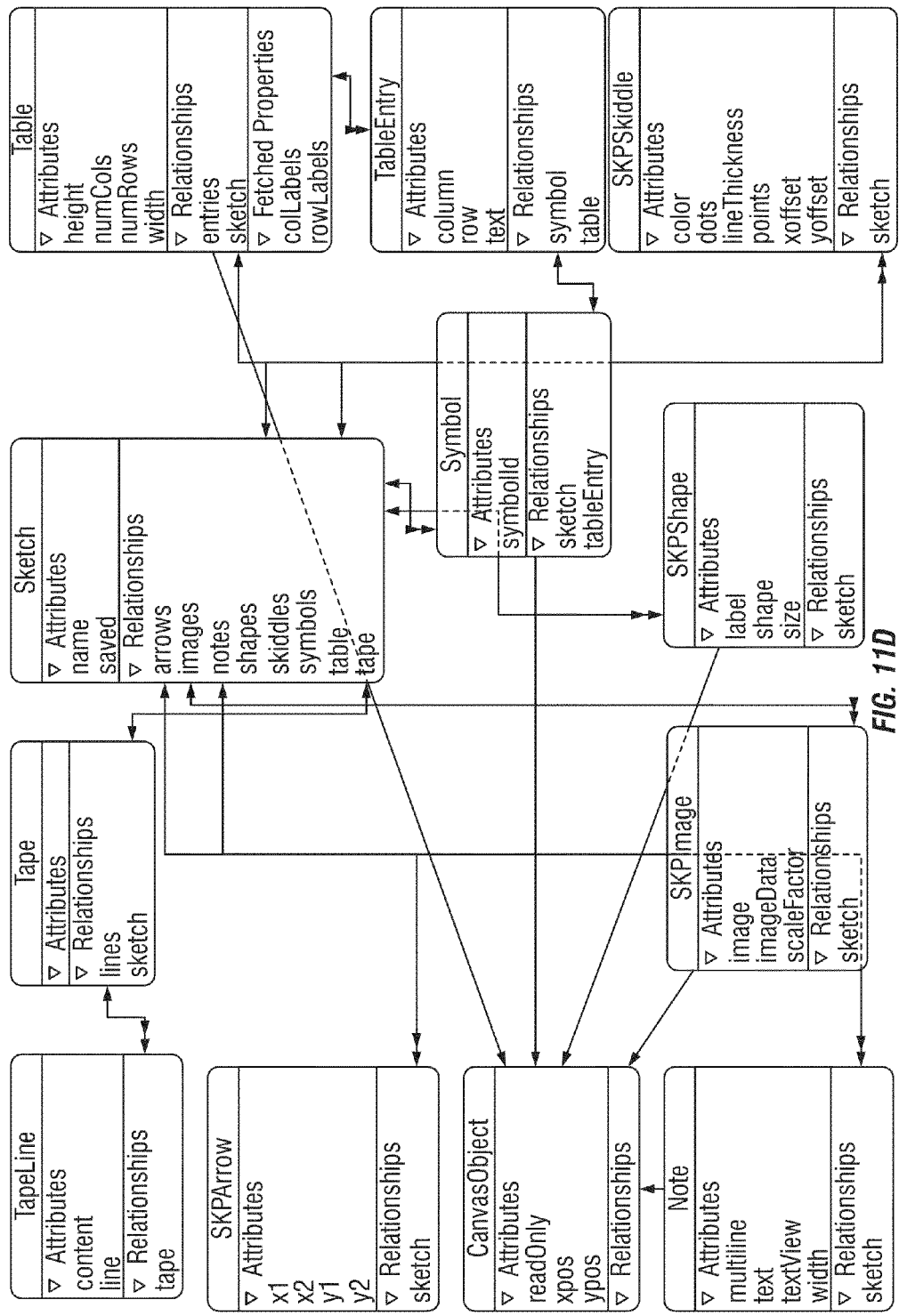
Figure 11E:
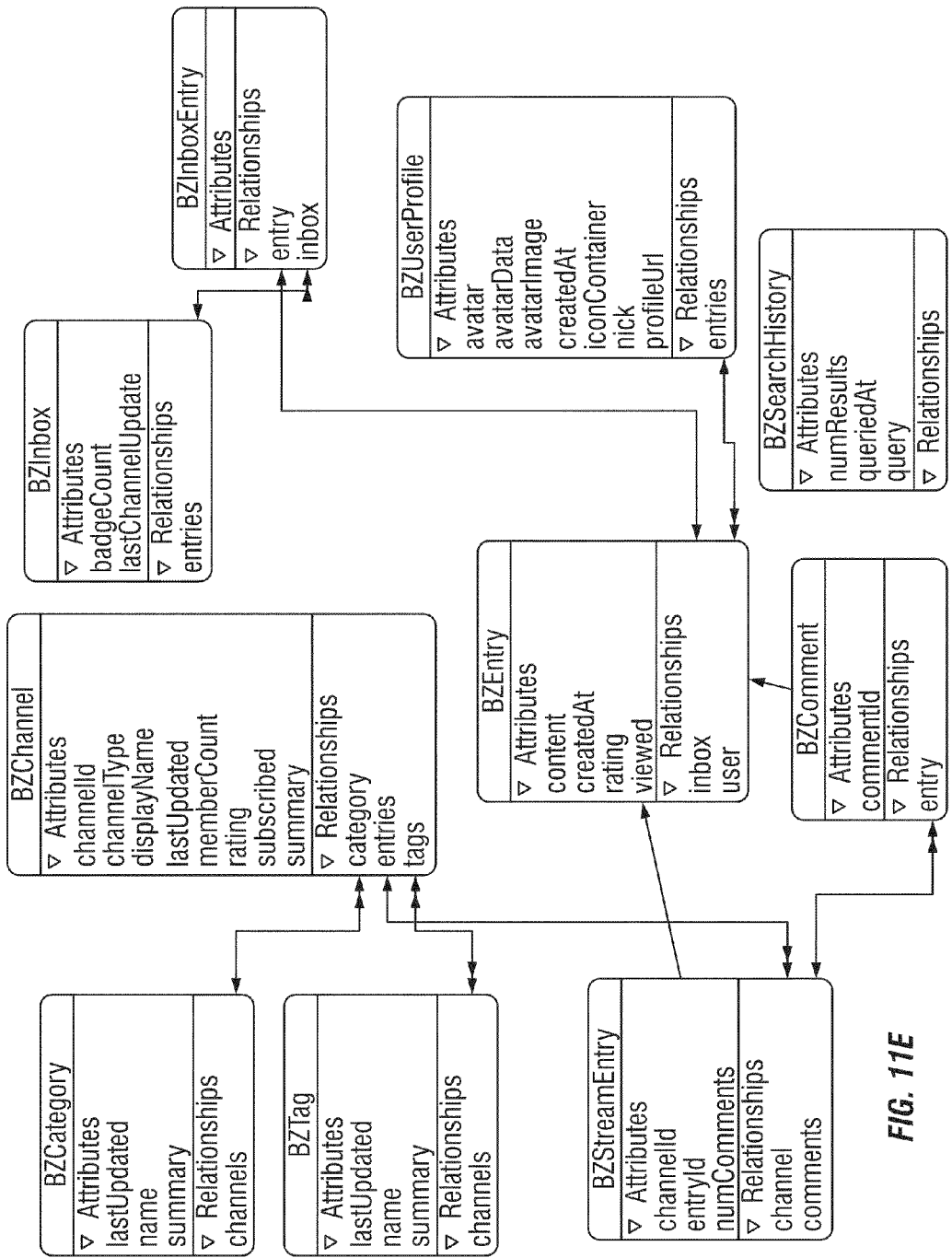

Thus, as shown in FIG. 10, two study groups consisting of a plurality of clients 40, 42 directly access study group servers #1 and #2 (41, 43 respectively). Through the facilities of an Apple push notification server 44, the study group clients also interact with a study group proxy server 46 which, in turn, interacts with study group servers #3 and #4 (45, 47 respectively). In this example, all interaction is in connection with a Google application engine 48. Those skilled in the art will appreciate that the architecture shown in FIG. 4 is an example of one embodiment of the invention and that other arrangements are within the scope of the invention. Thus, the use of an Apple push notification server and Google application engine is merely one example of facilities that may be used to implement this embodiment of the invention.

The applications herein disclosed therefore reinforce the complete classroom model of learning by maintaining the relationship between presentation of material, process-based learning, educator instruction, and peer collaboration.

FIGS. 11a-11e illustrate exemplary database schema for use in connection with a presently preferred embodiment of the invention.

Figure 12:
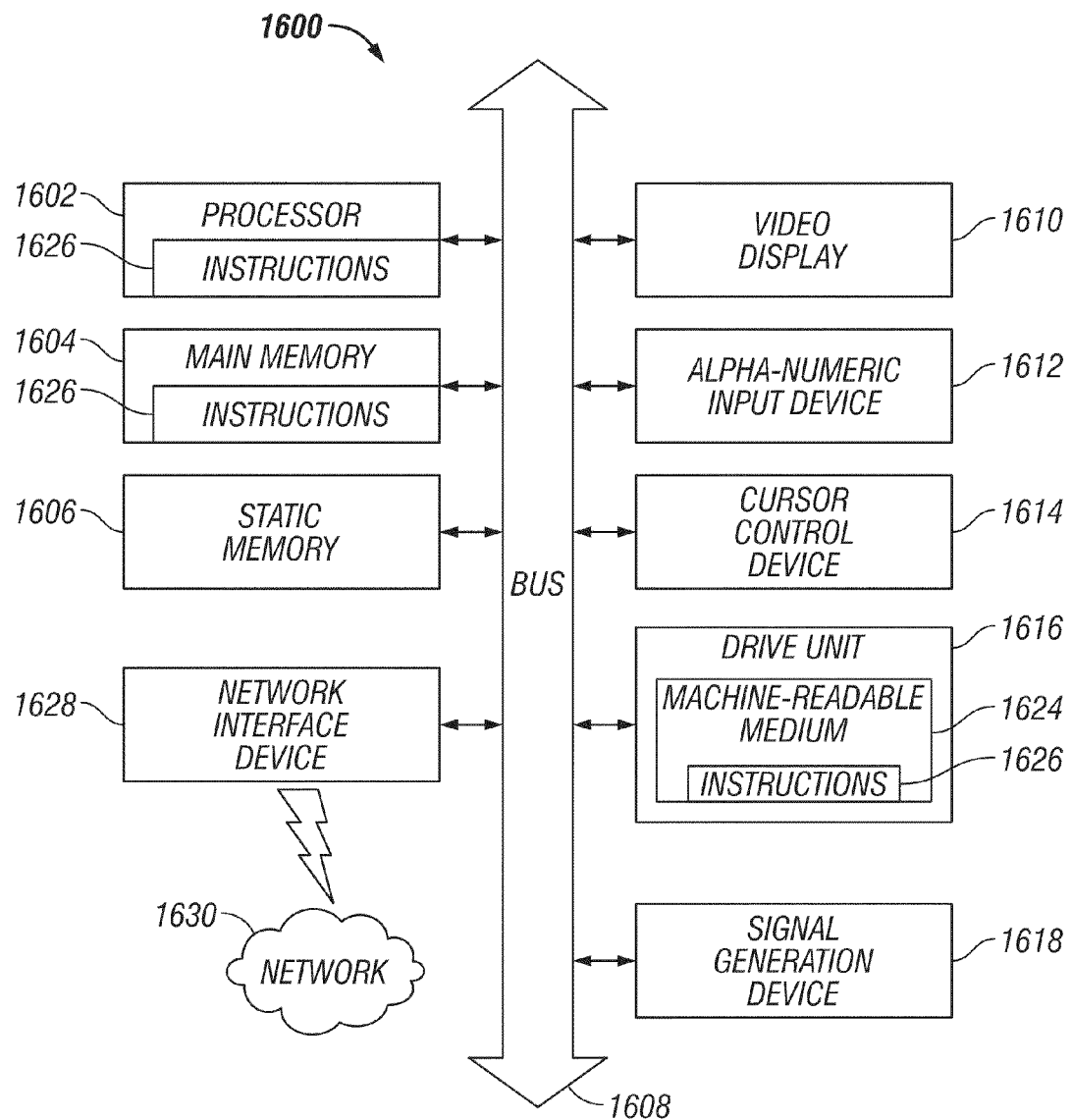
FIG. 12 is a block schematic diagram of a machine in the exemplary form of a computer system within which a set of instructions for causing the machine to perform any one of the foregoing methodologies may be executed.

FIG. 12 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A hand held teaching apparatus, comprising:
  a display;
  at least one motion sensor;
  a touch screen, responsive to user inputs;
  at least one processor configured to:
    present to a user a didactic sequence on the display, the didactic sequence comprising a plurality of tasks and task-related user prompts;
    monitor the at least one motion sensor;
    sense user-implemented changes in apparatus orientation between a landscape orientation and a portrait orientation;
    train the user to progress through the didactic sequence steps necessary to successfully complete and/or master tasks, wherein the training of the user includes:
      a) determine whether the user has crossed off an answer choice on the touch screen using either a finger or a stylus; and
        in the event that the user has crossed off the answer choice, determine whether remaining uncrossed off answer choice is a correct answer;
      b) determine whether the user has crossed off a first answer choice and a second answer choice, wherein after the first and second answer choices are crossed off, only an answer correlating to a step of the training operation remains;
      c) or any combination thereof;
    determine whether user inputs are appropriate inputs in connection with said tasks and prompts; and
    in the event that the user inputs are appropriate inputs, navigate through said didactic sequence between said tasks and said prompts, wherein the navigating through the didactic sequence comprises:
      encapsulate the teaching task in a mnemonic, the mnemonic including at least three elements; and
      change the apparatus orientation after completing each step in the didactic sequence, the didactic sequence comprising a process-based series of problem solving techniques, wherein the changing of the apparatus orientation permits user navigation through said didactic sequence if the step has been correctly completed, only if a first letter of the apparatus orientation after each apparatus rotation is consistent with a next element of the mnemonic, only if the mnemonic corresponds to the apparatus orientation changing at least twice, and a first element of the at least three elements corresponds to an initial apparatus orientation; and
  a memory coupled to the at least one processor and configured to provide the at least one processor with instructions.

2. The apparatus of claim 1, wherein said didactic sequence comprises: a training system in which a learning process is broken down into tangible steps, wherein mastery of each step must be demonstrated by the user before said user can more onto the next step in said sequence.

3. The apparatus of claim 1, wherein the at least one processor is further configured to: track user choices, selections, and performance and adapt content within said didactic sequence to an appropriate level for said user.

4. The apparatus of claim 1, wherein the at least one processor is further configured to determine whether the user has circled a correct variable on the touch screen using either a finger or a stylus before permitting other steps or actions be taken by said user.

5. The apparatus of claim 1, wherein the at least one processor is further configured to determine whether portions of a prompt have been eliminated that are not deemed necessary for solving a related problem using either a finger or stylus.

6. The apparatus of claim 1, further comprising: a notepad for user notes; and a toolbar to execute functions necessary for specific content in said didactic sequence.

7. The apparatus of claim 6, wherein, based upon didactic sequence content, said tool bar comprises calculator functions, and said notepad comprises an editable calculator tape that incorporates user-generated content.

8. The apparatus of claim 7, wherein said user-generated content is displayed either transparently over a question or side-by-side in a split screen mode.

9. The apparatus of claim 1, wherein the touch screen allows said user to type notes into an area of text.

10. The apparatus of claim 1, wherein the touch screen allows said user to tap on an unfamiliar word and add said word to a personal vocabulary list.

11. The apparatus of claim 1, wherein the at least one processor is further configured to respond to user-defined colors, gestures, and voice commands in connection with user-created searchable and sortable indexing and classification systems.

12. The apparatus of claim 1, wherein the at least one processor is further configured to respond to user-defined text excerpts or words and to associate multiple tags with said excerpts or words, including hierarchical tags, which are then displayed or hidden depending upon user preferences selected for a parent tag, wherein said tagged excerpts comprise any of textual, audio, and visual information, and wherein said tagged excerpts or words collectively comprise tagged data.

13. The apparatus of claim 12, wherein the at least one processor is further configured to export said tagged data, including any bibliographic information and user-generated notations or edits, to one or more third party applications and formats, or to save said tagged data to an online storage system.

14. The apparatus of claim 12, wherein the at least one processor is further configured to allow said user to share tagged, indexed files with other users.

15. The apparatus of claim 1, wherein the at least one processor is further configured to detect when a user shakes said apparatus when uncertain in connection with a specific question within said didactic sequence, and wherein a teacher's advice related to said specific question is presented to said user on said display.

16. The apparatus of claim 1, wherein the at least one processor is further configured to provide peer assistance to said user in connection with any question or text within said didactic sequence.

17. The apparatus of claim 16, wherein the at least one processor is further configured to present a user selectable study group button in connection with any question or text within said didactic sequence, wherein the at least one processor is further configured to query at least one database for all prior conversations related to said question in response to user selection of said study group button.

18. The apparatus of claim 17, wherein the at least one processor is further configured to respond to user selected preferences to determine search breadth in connection with a database query.

19. The apparatus of claim 17, wherein the at least one processor is further configured to receive and post a user question or comment, and to receive at least one notification in response thereto.

20. The apparatus of claim 1, wherein the at least one processor is further configured to:
display on the display a list of questions, the question being color coded based on whether the user answered the questions correctly, incorrectly, or skipped a question.

21. The apparatus of claim 1, wherein the at least three elements of the mnemonic corresponds to the apparatus orientation changing from 1) the portrait orientation to the landscape orientation, and 2) the landscape orientation to the portrait orientation.

22. A computer implemented teaching method, comprising:
presenting to a user a didactic sequence on a display, the didactic sequence comprising a plurality of tasks and task-related user prompts;
monitoring at least one motion sensor;
sensing user-implemented changes in apparatus orientation between a landscape orientation and a portrait orientation;
training the user to progress through the didactic sequence steps necessary to successfully complete and/or master tasks, wherein the training of the user includes:
a) determining whether the user has crossed off an answer choice on the touch screen using either a finger or a stylus; and
in the event that the user has crossed off the answer choice, determining whether remaining uncrossed off answer choice is a correct answer;
b) determining whether the user has crossed off a first answer choice and a second answer choice,
wherein after the first and second answer choices are crossed off, only an answer correlating to a step of the training operation remains;
c) or any combination thereof;
determining whether user inputs are appropriate inputs in connection with said tasks and prompts; and
in the event that the user inputs are appropriate inputs, navigating through said didactic sequence between said tasks and said prompts, wherein the navigating through the didactic sequence comprises:
encapsulating the teaching task in a mnemonic, the mnemonic including at least three elements; and
changing the apparatus orientation after completing each step in the didactic sequence, the didactic sequence comprising a process-based series of problem solving techniques, wherein the changing of the apparatus orientation permits user navigation through said didactic sequence if the step has been correctly completed, only if a first letter of the apparatus orientation after each apparatus rotation is consistent with a next element of the mnemonic, only if the mnemonic corresponds to the apparatus orientation changing at least twice, and a first element of the at least three elements corresponds to an initial apparatus orientation.

23. A computer program product for teaching, the computer program product being embodied in a non-transitory computer readable storage medium and comprising computer instructions for:
presenting to a user a didactic sequence on a display, the didactic sequence comprising a plurality of tasks and task-related user prompts;
monitoring at least one motion sensor;
sensing user-implemented changes in apparatus orientation between a landscape orientation and a portrait orientation;
training the user to progress through the didactic sequence steps necessary to successfully complete and/or master tasks, wherein the training of the user includes:
a) determining whether the user has crossed off an answer choice on a touch screen using either a finger or a stylus; and
in the event that the user has crossed off the answer choice, determining whether remaining uncrossed off answer choice is a correct answer;
b) determining whether the user has crossed off a first answer choice and a second answer choice,
wherein after the first and second answer choices are crossed off, only an answer correlating to a step of the training operation remains;
c) or any combination thereof;
determining whether user inputs are appropriate inputs in connection with said tasks and prompts; and
in the event that the user inputs are appropriate inputs, navigating through said didactic sequence between said tasks and said prompts, wherein the navigating through the didactic sequence comprises:
encapsulating the teaching task in a mnemonic, the mnemonic including at least three elements; and
changing the apparatus orientation after completing each step in the didactic sequence, the didactic sequence comprising a process-based series of problem solving techniques, wherein the changing of the apparatus orientation permits user navigation through said didactic sequence if the step has been correctly completed, only if a first letter of the apparatus orientation after each apparatus rotation is consistent with a next element of the mnemonic, only if the mnemonic corresponds to the apparatus orientation changing at least twice, and a first element of the at least three elements corresponds to an initial apparatus orientation.

\* \* \* \* \*